United States Patent
Terao

(10) Patent No.: US 10,412,044 B2
(45) Date of Patent: Sep. 10, 2019

(54) INFORMATION PROCESSING APPARATUS CAPABLE OF IMPROVING CONVENIENCE FOR USERS IN CHANGE OF NAMES RELATING TO MANAGEMENT OF DESTINATION TABLES, CONTROL METHOD THEREFOR, AND STORAGE MEDIUM

(71) Applicant: CANON KABUSHIKI KAISHA, Tokyo (JP)

(72) Inventor: Yoshihide Terao, Moriya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/918,150

(22) Filed: Mar. 12, 2018

(65) Prior Publication Data
US 2018/0270193 A1   Sep. 20, 2018

(30) Foreign Application Priority Data
Mar. 14, 2017   (JP) .................................. 2017-048420

(51) Int. Cl.
*G06F 3/12* (2006.01)
*H04L 29/12* (2006.01)

(52) U.S. Cl.
CPC ........ *H04L 61/2069* (2013.01); *G06F 3/1204* (2013.01); *G06F 3/1231* (2013.01); *G06F 3/1285* (2013.01); *G06F 3/1286* (2013.01); *H04L 61/1547* (2013.01); *H04L 61/3015* (2013.01)

(58) Field of Classification Search
None
See application file for complete search history.

(56) References Cited

U.S. PATENT DOCUMENTS

| | | | |
|---|---|---|---|
| 9,817,842 B2 | 11/2017 | Terao | |
| 2012/0278426 A1* | 11/2012 | Nakagawa | G06F 3/0604 709/217 |
| 2016/0012139 A1* | 1/2016 | Terao | G06F 16/1794 726/5 |

FOREIGN PATENT DOCUMENTS

| | | |
|---|---|---|
| JP | 2001358864 A | 12/2001 |
| JP | 2016019148 A | 2/2016 |

* cited by examiner

*Primary Examiner* — Andrew H Lam
(74) *Attorney, Agent, or Firm* — Rossi, Kimms & McDowell LLP

(57) ABSTRACT

An information processing apparatus which is capable of improving convenience for users in changing names of a user group and a group destination table. An HDD stores a user group including at least one user ID, and a group destination table associated with the user group and including at least one address. A user is prompted to select a user group stored in the HDD and associated with a predetermined group destination table. When a new name for the selected user group is received, the received new name is set as a name of the predetermined group destination table.

10 Claims, 11 Drawing Sheets

FIG. 3A

| USER GROUP SETTING SCREEN | |
|---|---|
| USER GROUP NAME: | DESIGN ROOM 11 |
| USER GROUP ID: | GROUP A |
| REGISTRATION OF BELONGING USERS: | AAA<br>BBB<br>CCC |

FIG. 3B

| LIST OF GROUP DESTINATION TABLES | DESTINATION TABLE NAME | THE NUMBER OF DESTINATIONS |
|---|---|---|
| ■ GROUP DESTINATION TABLE 1 | DESIGN ROOM 11 | 10 |
| ■ GROUP DESTINATION TABLE 2 | DESIGN ROOM 21 | 5 |
| ■ GROUP DESTINATION TABLE 3 | DESIGN ROOM 31 | 3 |
| ■ GROUP DESTINATION TABLE 4 | DESIGN ROOM 41 | 6 |
| ■ GROUP DESTINATION TABLE 5 | DESIGN ROOM 51 | 15 |
| ■ GROUP DESTINATION TABLE 6 | DESIGN ROOM 61 | 8 |
| ■ GROUP DESTINATION TABLE 7 | DESIGN ROOM 71 | 7 |
| ■ GROUP DESTINATION TABLE 8 | MANAGEMENT DIVISION 1 | 6 |
| ■ GROUP DESTINATION TABLE 9 | MANAGEMENT DIVISION 2 | 4 |
| ■ GROUP DESTINATION TABLE 10 | MANAGEMENT DIVISION 3 | 2 |

| DESTINATION TABLE ID | DESTINATION TABLE NAME | DESTINATION DATA |
|---|---|---|
| 1 | DESTINATION TABLE 1 | DESTINATION 1, DESTINATION 2, DESTINATION 3 |
| 2 | DESTINATION TABLE 2 | DESTINATION 4, DESTINATION 5 |
| ⋮ | ⋮ | ⋮ |
| 10 | DESTINATION TABLE 10 | DESTINATION 99, DESTINATION 100 |

| GROUP DESTINATION TABLE ID | GROUP DESTINATION TABLE NAME | USER GROUP ID | DESTINATION DATA |
|---|---|---|---|
| 1 | DESIGN ROOM 11 | GROUP A | DESTINATION A, DESTINATION B |
| 2 | DESIGN ROOM 21 | GROUP B | DESTINATION C, DESTINATION D |
| ⋮ | ⋮ | | ⋮ |
| N | MANAGEMENT DIVISION N | GROUP N | DESTINATION X, DESTINATION Y, DESTINATION Z |

| INDIVIDUAL DESTINATION TABLE ID (608) | INDIVIDUAL DESTINATION TABLE NAME (609) | BELONGING USER (610) | DESTINATION DATA (611) |
|---|---|---|---|
| 1 | INDIVIDUAL DESTINATION TABLE 1 | USER A | DESTINATION A1, DESTINATION A2 |
| 2 | INDIVIDUAL DESTINATION TABLE 2 | USER B | DESTINATION A4, DESTINATION A5 |
| ⋮ | ⋮ | ⋮ | ⋮ |
| N | INDIVIDUAL DESTINATION TABLE N | USER N | DESTINATION A9, DESTINATION A10 |

| DESTINATION NAME | DESTINATION A1 |
|---|---|
| HOST NAME | 172.24.1.1 |
| FOLDER PATH NAME | ¥¥smb¥path |
| USER NAME | USER A |
| PASSWORD | ***** |

| USER GROUP ID | USER GROUP NAME | BELONGING USER ID |
|---|---|---|
| GROUP A | DESIGN ROOM 11 | USER A, USER B, USER C |
| GROUP B | DESIGN ROOM 21 | USER B, USER D |
| ⋮ | ⋮ | ⋮ |
| GROUP N | MANAGEMENT DIVISION N | USER A, USER N |

700

INFORMATION PROCESSING APPARATUS CAPABLE OF IMPROVING CONVENIENCE FOR USERS IN CHANGE OF NAMES RELATING TO MANAGEMENT OF DESTINATION TABLES, CONTROL METHOD THEREFOR, AND STORAGE MEDIUM

BACKGROUND OF THE INVENTION

Field of the Invention

The present invention relates to an information processing apparatus, a control method therefor, and a storage medium, and in particular to an information processing apparatus that has a user login function and a destination table management function, a control method therefor, and a storage medium.

Description of the Related Art

Conventionally, an image processing apparatus such as a digital multifunction peripheral has offered a function of digitizing scanned-in documents and sending them via e-mails or sending them as files (e.g. SMB transmission), to arbitrary transmission destinations.

There is known a technique that, when managing transmission destinations in such e-mail transmission and file transmission by means of an address book in the image processing apparatus, stores the transmission destinations in group destination tables obtained by categorizing the transmission destinations so as to improve searchability of the transmission destinations (see, for example, Japanese Laid-Open Patent Publication (Kokai) No. 2001-358864).

There is known another technique that allows only a specific user group confirmed by user authentication to access destinations included in each group destination table so as to improve searchability at the time of browsing and also to maintain security (see, for example, Japanese Laid-Open Patent Publication (Kokai) No. 2016-19148).

To control access to each group destination table by using the technique described in Japanese Laid-Open Patent Publication (Kokai) No. 2016-19148, it is necessary to create user groups in advance on a user group setting screen as shown in FIG. 3A.

On this screen, a plurality of users who belongs to a user group are allowed to be arbitrarily registered by inputting user names into a field labeled "REGISTRATION OF BELONGING USERS". A user group name is allowed to be arbitrarily set by inputting the user group name into a field labeled "USER GROUP NAME". A plurality of user groups can be created.

After user groups are created, group destination table settings are configured through setting screens as shown in FIGS. 3B and 3C.

FIG. 3B shows the setting screen on which group destination tables are displayed in list form, and a plurality of group destination tables can be set through the screen.

When one of the group destination tables displayed in list form is selected on the screen in FIG. 3B, a setting screen for configuring settings on the selected group destination table is displayed. FIG. 3C shows the setting screen for a group destination table 1, which is displayed when the group destination table 1 is selected.

On the group destination table setting screen, a user group, to which a selected group destination table is to be opened, is selected and set from among the user groups created through the screen shown in FIG. 3A. As shown in FIG. 3C, when a user group "DESIGN ROOM 11" is set as a user group to which the group destination table 1 is to be open, only users belonging to the user group "DESIGN ROOM 11" are allowed to access destinations included in the group destination table 1.

On the group destination table setting screen, a name of a group destination table can be arbitrarily set. Namely, referring to FIG. 3C, a name of the group destination table 1 and a name of the user group to which the group destination table 1 is to be opened are the same, i.e. "DESIGN ROOM 11", but different names may be set as the name of the group destination table 1 and the name of the user group.

However, if a name of a user group and a name of a group destination table can be arbitrarily set as described in Japanese Laid-Open Patent Publication (Kokai) No. 2016-19148, the name of a user group and the name of a group destination table need to be individually set even when the user group and the group destination table are to be handled with the same name. In this case, convenience for users deteriorates.

SUMMARY OF THE INVENTION

The present invention provides an information processing apparatus, which is capable of improving convenience for users in change of names of a user group and a group destination table, a control method therefor, and a storage medium.

Accordingly, the present invention provides an information processing apparatus that has a storage unit that stores a user group including at least one user ID, and a group destination table associated with the user group and including at least one address, comprising, a selection unit configured to prompt a user to select a user group stored in the storage unit and associated with a predetermined group destination table, a receiving unit configured to receive a new name for the user group selected by the selection unit, and a first setting unit configured to set the new name received by the receiving unit as a name of the predetermined group destination table.

According to the present invention, convenience for users in change of names of a user group and a group destination table is improved.

Further features of the present invention will become apparent from the following description of exemplary embodiments (with reference to the attached drawings).

BRIEF DESCRIPTION OF THE DRAWINGS

FIGS. 3A to 3C are diagrams for explaining a way of change of names of a user group and a group destination table.

FIGS. 6A to 6D are diagrams for explaining a way to manage data in a destination table DB, an individual destination table DB, and a group destination table DB shown in FIG. 4.

DESCRIPTION OF THE EMBODIMENTS

The present invention will now be described in detail below with reference to the accompanying drawings showing embodiments thereof.

Embodiment 1

Figure 1:
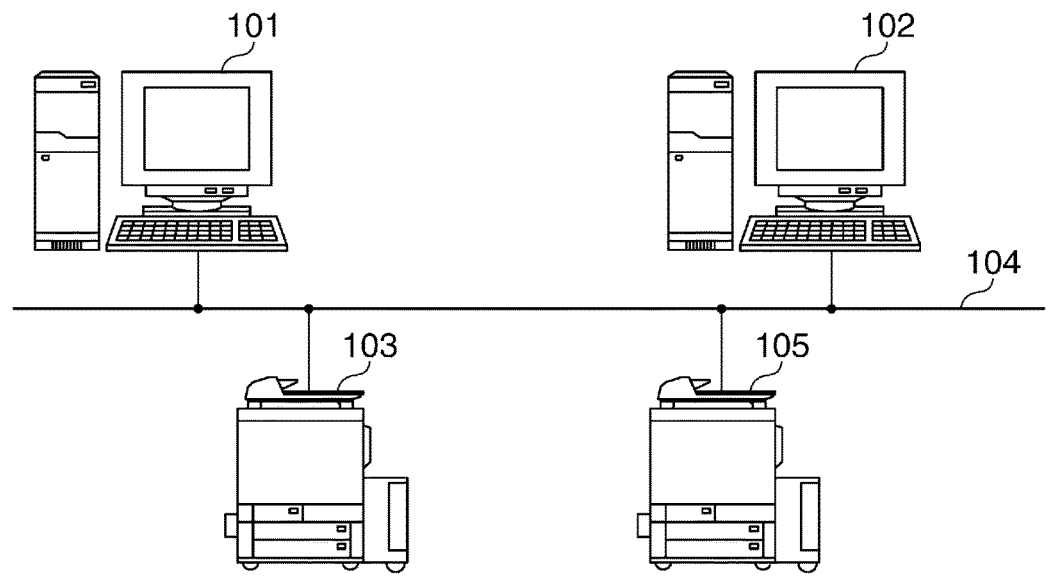
FIG. 1 is a diagram for explaining an arrangement of a system including an MFP as an information processing apparatus according to the present invention.

FIG. 1 is a diagram for explaining an arrangement of a system including an MFP as an information processing apparatus according to the present invention.

Referring to FIG. 1, the MFPs 103 and 105 are capable of digitizing an image on a scanned-in sheet original and sending the digitized image to a shared folder or the like of a computer 101 via a network 104.

The MFPs 103 and 105 also have a user authentication function. A device administrator is able to set whether or not user authentication is required to operate the MFPs 103 and 105.

User names, passwords, and the like of respective users which are required for user authentication can be managed in the MFPs 103, 105, or in an authentication server 102 on a network 104.

User groups and group destination tables managed by the MFPs 103 and 105 can be set by each of the MFPs 103 and 105. The user groups and the group destination tables managed by the MFPs 103 and 105 can also be set through a web browser on the computer 101 or the authentication server 102 via the network 104.

Figure 2:
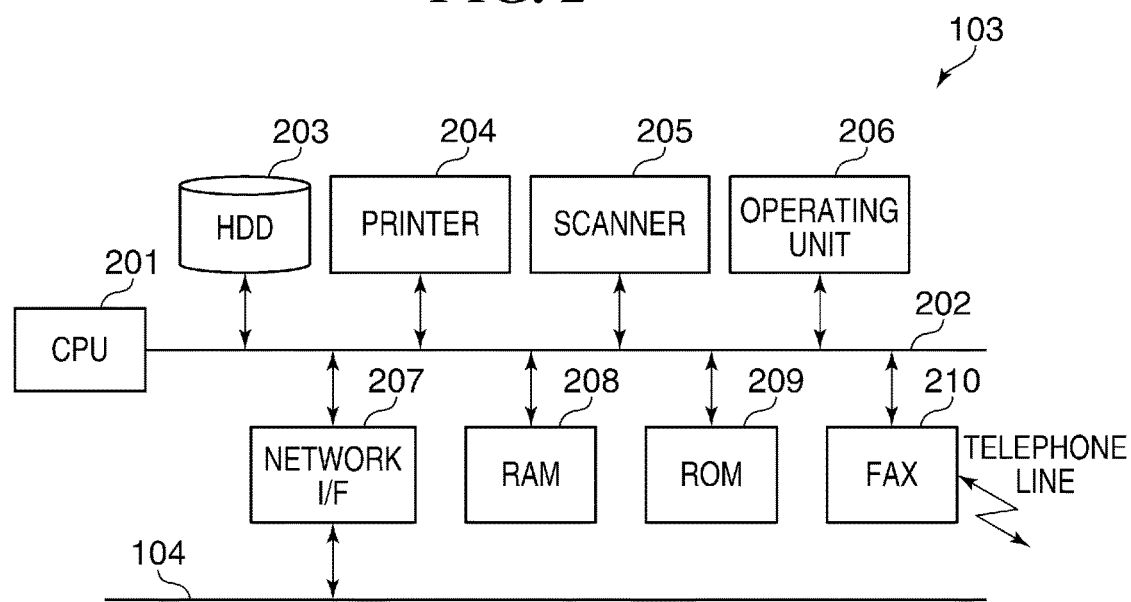
FIG. 2 is a block diagram showing a hardware arrangement of the MFP.

FIG. 2 is a block diagram showing a hardware arrangement of the MFP 103. It should be noted that the MFP 105 has the same hardware arrangement as the MFP 103, and hence the following description will be given only of the MFP 103.

Referring to FIG. 2, a CPU 201 controls the overall operation of the MFP 103 by loading programs stored in a ROM 209 into a RAM 208. Further, CPU 201 communicates with each component element of the MFP 103 via a bus 202.

A printer 204 prints images based on image data input to the printer 204, on recording paper (sheets).

A scanner 205 scans an image formed on an original, which are placed on an original platen glass by a user, and accumulates the obtained image data in an HDD 203, the RAM 208, or the like. The scanner 205 includes an original feeder (not shown) and is capable of successively feeding a plurality of originals placed on the original feeder to the original platen glass and scanning the originals.

The HDD 203 is a hard disk drive and is capable of storing image data input from the scanner 205, various types of user data, data such as user groups and various destination tables stored in DBs 404 to 407, which is to be described later with reference to FIG. 4, and the like.

An operating unit 206 includes a plurality of keys for a user to provide instructions, and a display unit which displays various types of information which a user should be notified of.

A network I/F 207 connects the MFP 103 to the network 104, and controls transmission to the computer 101 which is a file sharing server, and mail transmission, of image data scanned by the scanner 205, the transmissions to the computer 101 and the mail transmission being performed via the network 104.

A fax 210 sends and receives image data via a telephone line.

Figure 4:
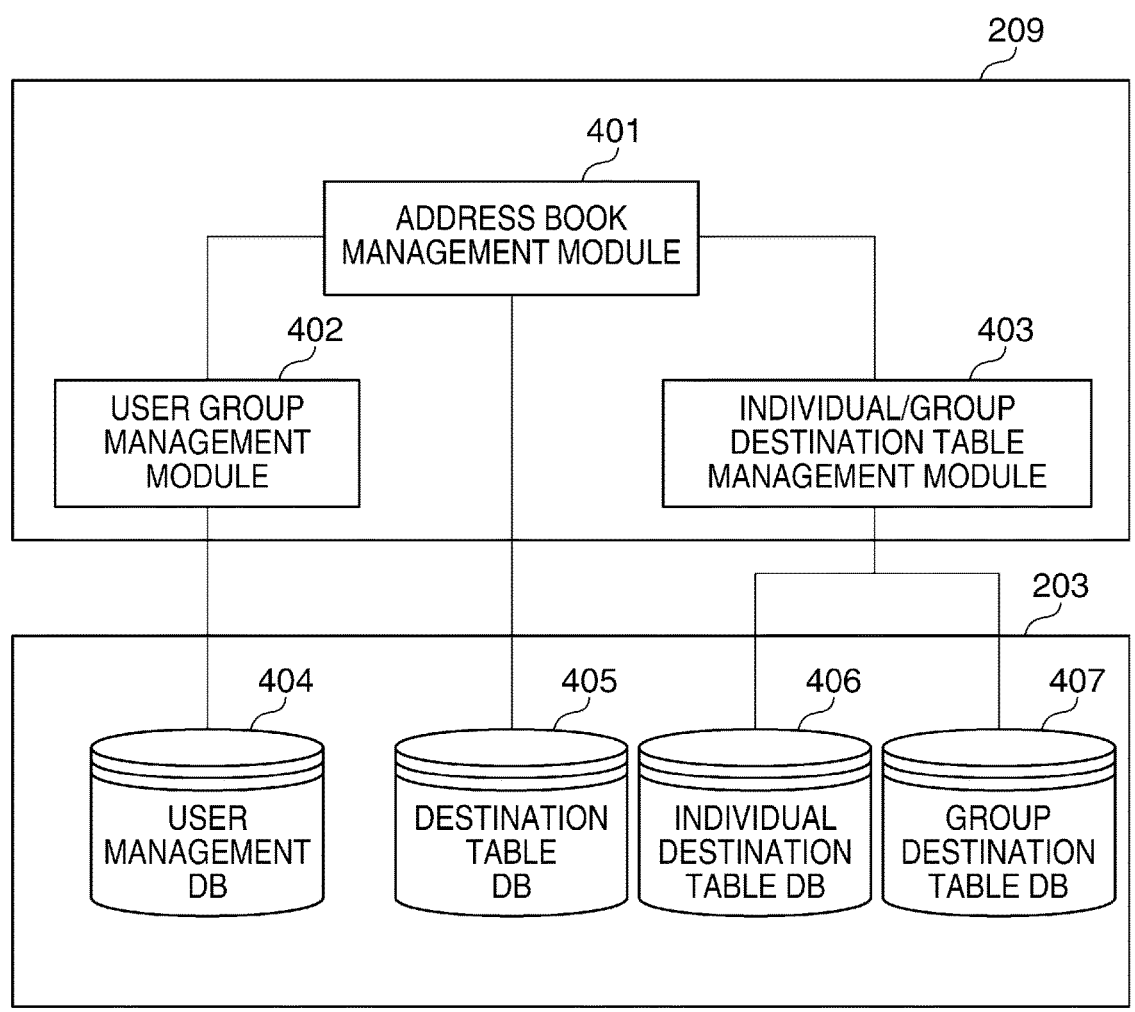
FIG. 4 is a configuration diagram showing modules relating to an address book on a ROM shown in FIG. 2, and DBs on an HDD that are respectively accessed by the modules.

FIG. 4 is a configuration diagram showing modules relating to an address book stored in the ROM 209 of the MFP 103, and DBs stored in the HDD 203 which are respectively accessed by the modules.

Referring to FIG. 4, the modules relating to the address book (i.e. an address book management module 401, a user group management module 402, and an individual/group destination table management module 403) are programs stored in the ROM 209. Each of these modules is loaded into the RAM 208 and executed by the CPU 201.

The address book management module 401 manages names of destination tables, and addresses that are destinations to which data is sent by the fax 210 or the network I/F 207 (hereafter referred to as destination data). The names of destination tables and the destination data to be managed are stored into the destination table DB 405, the individual destination table DB 406, and the group destination table DB 407.

Out of the names of the destination tables and the destination data managed by the address book management module 401, data accessible by all users are stored in the destination table DB 405 in the HDD 203.

The user group management module 402 manages user group information stored in the user management DB 404. Further, the address book management module 401 manages the user management DB 404 via the user group management module 402. The detail will be given later with reference to FIG. 7.

The individual/group destination table management module 403 manages the names of destination tables for individuals (hereafter referred to as individual destination tables) and the destination data stored in the individual destination table DB 406 in the HDD 203. The individual destination tables are accessible only by designated users. The individual/group destination table management module 403 also manages the names of destination tables for groups (hereafter referred to as group destination tables) and the destination data stored in the group destination table DB 407 in the HDD 203. Each of the group destination tables is accessible only by users belonging to a designated user group.

The address book management module 401 manages names of the individual destination tables stored in the individual destination table DB 406, and names of the group destination tables stored in the group destination table DB 407, and the destination data, via the individual/group destination table management module 403. The detail will be given later with reference to FIGS. 6A to 6D.

Figure 5:
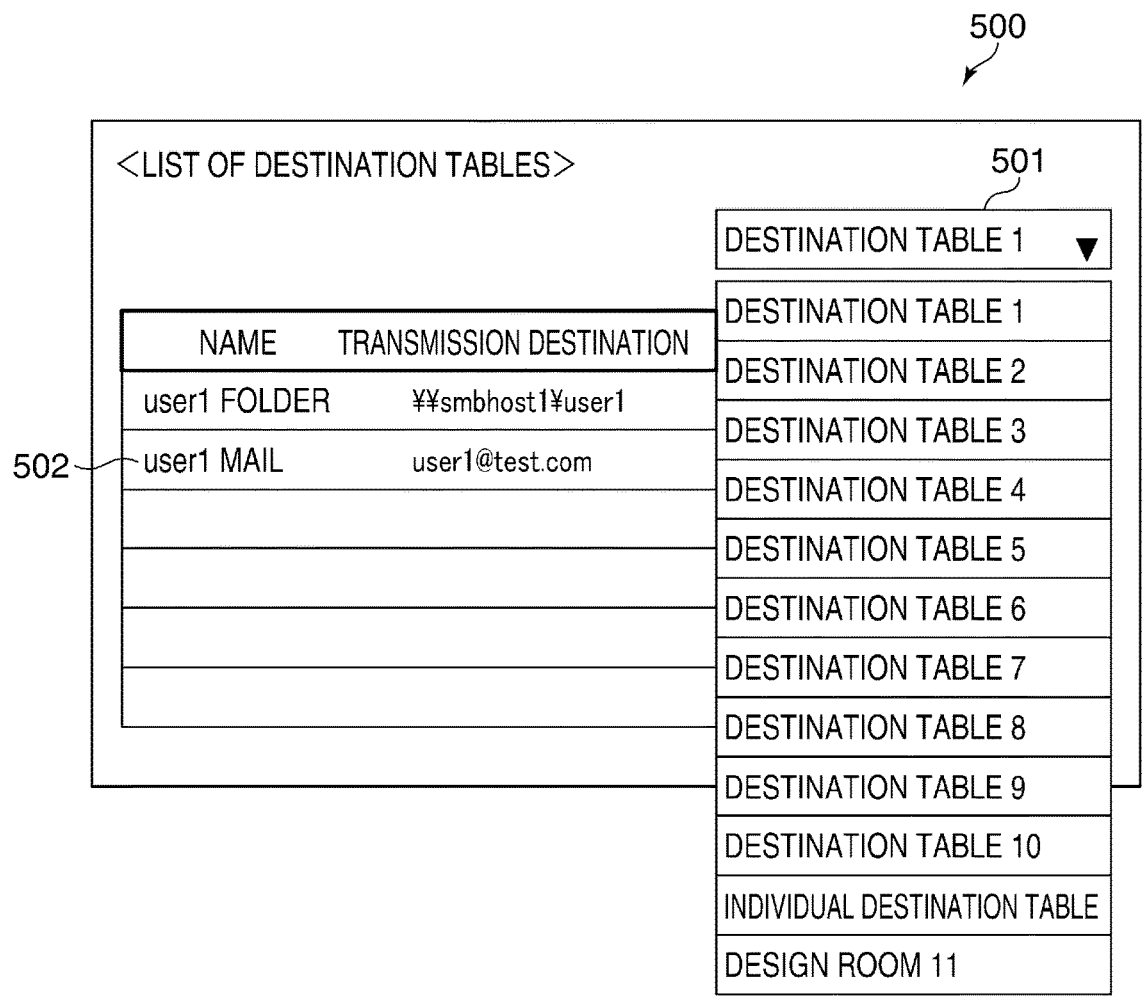
FIG. 5 is a diagram showing a screen on which names of all destination tables are displayed in list form.

FIG. 5 is a diagram showing a screen, which is displayed on a display unit of the operating unit 206, to display in list form the names of all the destination tables managed in the destination table DB 405, the individual destination table DB 406, and the group destination table DB 407.

A list 501 in FIG. 5 is displayed when the address book management module 401 receives a list display request for displaying in list form the names of all the destination tables from a user via the operating unit 206.

It should be noted that the names of the destination tables to be displayed in list form on the display unit of the operating unit 206 may be restricted according to a user authority of a user who logged in to the MFP 103.

It should be noted that in the present embodiment, "DESIGN ROOM 11" that is a name of a group destination table 1 is displayed as a name of a group destination table in the list 501. The name of the group destination table 1 is set and registered in advance through the setting screen for the group destination table 1 shown in FIG. 3C.

FIGS. 6A to 6C are diagrams for explaining a way to manage the data in the destination table DB 405, the individual destination table DB 406, and the group destination table DB 407.

FIG. 6A shows a data management table 600a for the destination tables, which are managed in the destination table DB 405.

A column 601 of the data management table 600a shows destination table IDs. The destination table IDs (here, from 1 to 10) are uniquely assigned to the respective destination tables managed in the destination table DB 405. The destination tables are stored in the HDD 203 while being linked to the names of the destination tables shown in a column 602 and the destination data shown in a column 603.

FIG. 6B shows a data management table 600b for the destination tables, which are managed in the group destination table DB 407.

A column 604 of the data management table 600b shows group destination table IDs. The group destination table IDs (here, from 1 to N) are uniquely assigned to the respective group destination tables managed in the group destination table DB 407. Here, N is a positive integer that is an arbitrarily set. The group destination tables are stored in the HDD 203 while being linked to the names of the group destination tables shown in a column 605, IDs of user groups with access rights (hereafter referred to as user group IDs) shown in a column 606, and the destination data shown in a column 607.

The user group IDs shown in the column 606 are the same with user group IDs in a data management table 700 shown in FIG. 7, to be described later, managed by the user management DB 404.

Figure 3C:
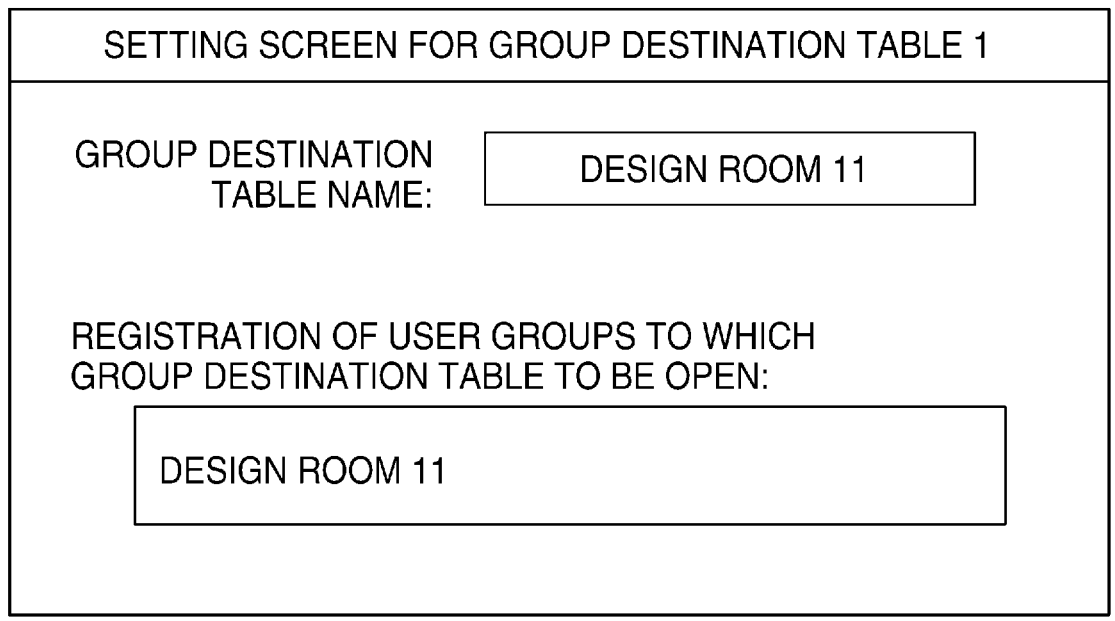

The names of the group destination tables shown in the column 605 are set and registered in advance through a setting screen for the group destination table setting screen exemplified in FIG. 3C.

FIG. 6C shows a data management table 600c for the destination tables, which are managed in the individual destination table DB 406.

A column 608 of the data management table 600c shows individual destination table IDs. The individual destination table IDs (here, from 1 to N) are uniquely assigned to the respective individual destination tables managed in the individual destination table DB 406. Here, N is a positive integer that is an arbitrarily set. The individual destination tables are stored in the HDD 203 while being linked to the names of the individual destination tables shown in a column 609, belonging users with access rights shown in a column 610, and the destination data shown in a column 611.

FIG. 6D shows a data table 600d showing in detail one piece of the destination data stored in the destination table DB 405, the individual destination table DB 406, and the group destination table DB 407.

Here, the data table 600d showing in detail one piece of the destination data stored in the data management table 600c is exemplified. A destination name "DESTINATION A1", a host name "172.24.1.1" to which data is to be sent, and so forth of the destination data are stored in the data table 600d. It should be noted that data describing details of the other destination data stored in the data management tables 600a to 600c are also managed as the same data tables as the data table 600d.

Figures 7, 8:
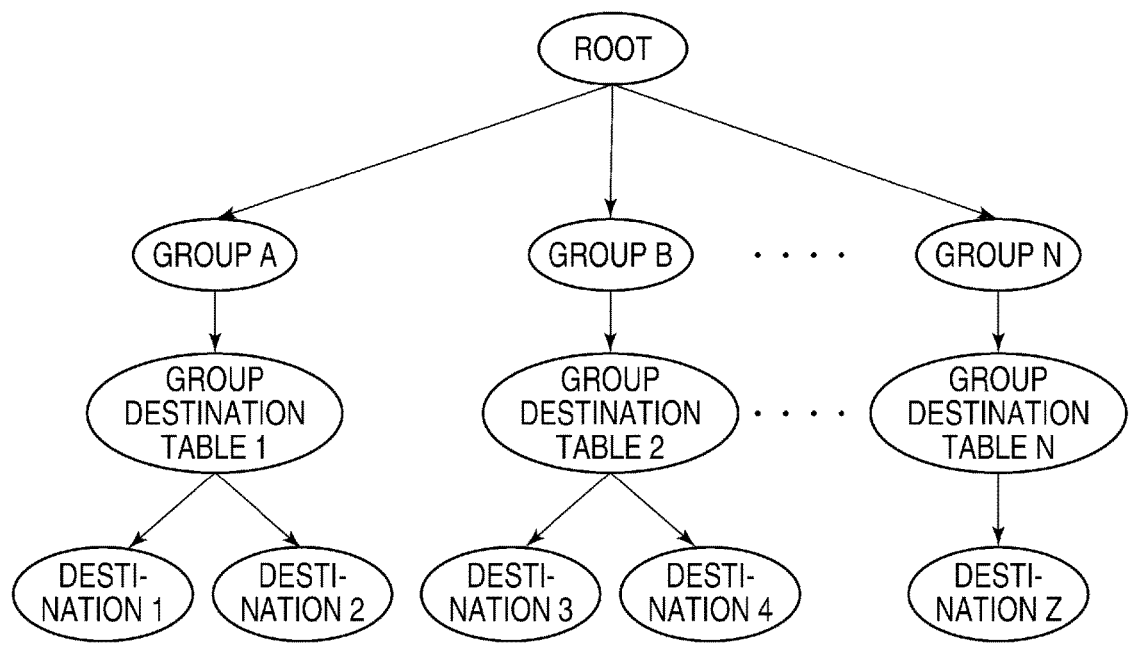
FIG. 7 is a diagram showing a data management table for user groups managed in the user management DB shown in FIG. 4.
FIG. 8 is a data structure diagram showing a relationship among user groups, group destination tables, and destination data.

FIG. 7 is a diagram showing a data management table 700 for the user groups, which is managed in the user management DB 404.

An arbitrary user group ID and an arbitrary name can be set for each of the user groups. IDs of users belonging to each of the user groups (hereafter referred to as "belonging user IDs") can be set as well.

The IDs, names, and belonging user IDs of the user groups managed in the data management table 700 are set and registered in advance through the user group setting screen in FIG. 3A.

FIG. 8 is a data structure diagram showing a relationship among the user groups, the group destination tables, and the destination data described above with reference to FIGS. 6A to 6D and 7.

The user groups, the group destination table, and the destination data are managed in a tree structure, in which the group destination tables are linked to nodes of the respective user groups, and the destination data are linked to the group destination tables. In FIG. 8, for example, the GROUP DESTINATION TABLE 1 is linked to the node of the GROUP A, and the DESTINATION 1 and the DESTINATION 2 are linked to the GROUP DESTINATION TABLE 1.

As a result, only users belonging to a user group are allowed to access and refer to destination data in a group destination table linked to the user group. In other words, users are allowed to refer to only destination data in a group destination table linked to a user group to which the users belong.

A description of the procedure of a change process of names of a user group and a group destination table according to the present embodiment will be given, referring to a flowchart shown in FIG. 9.

It should be noted that the name changing process shown by the flowchart is executed by the CPU 201 after a program stored in the ROM 209 is loaded into the RAM 208. A result of execution by the CPU 201 is displayed on the display unit of the operating unit 206.

Figure 9:
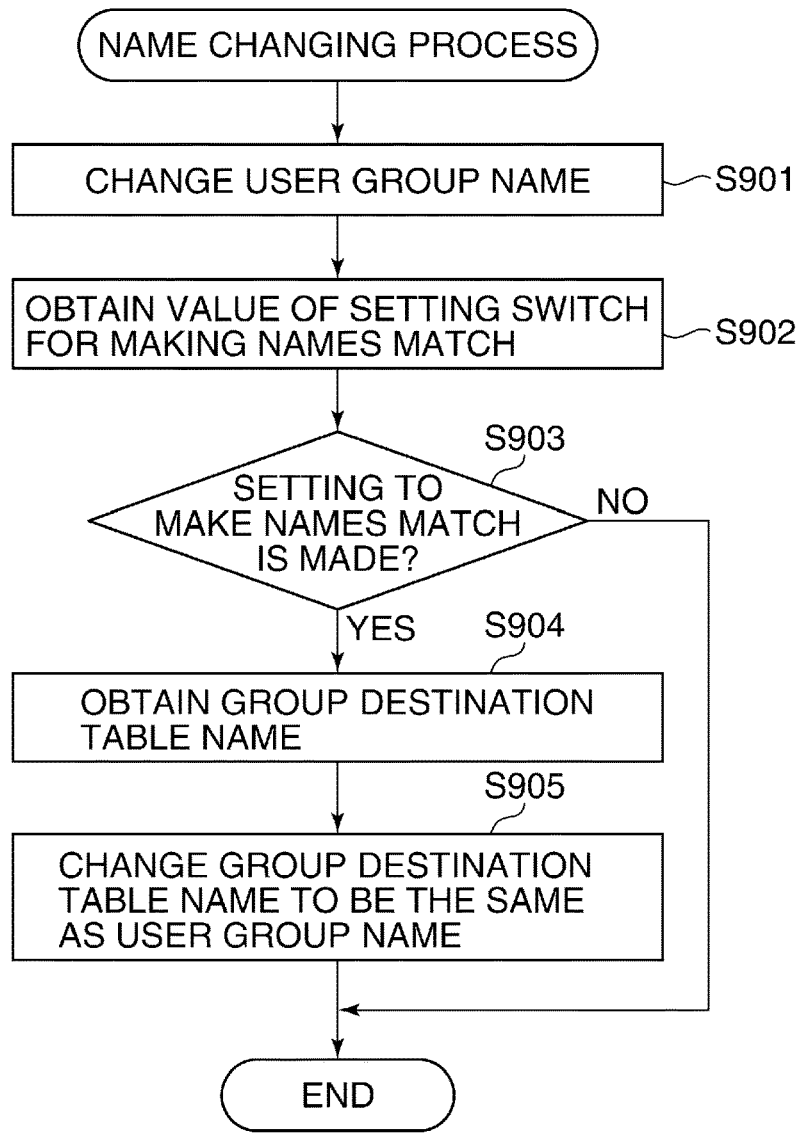
FIG. 9 is a flowchart showing a procedure of a change process of names of a user group and a group destination table in an embodiment 1.

Referring to FIG. 9, first, after a user inputs an ID of a user group, a name of which is desired to be changed, in the field labeled "USER GROUP ID" in the user group setting screen shown in FIG. 3A, the CPU 201 waits for the user to input an arbitrary name of the user group in the field labeled "USER GROUP NAME" shown in FIG. 3A. Upon receiving these input data (user instructions) from the user, the CPU 201 executes change of the user group name and updates the data management table 700 shown in FIG. 7 with the change of the user group name (step S901).

Figure 10:
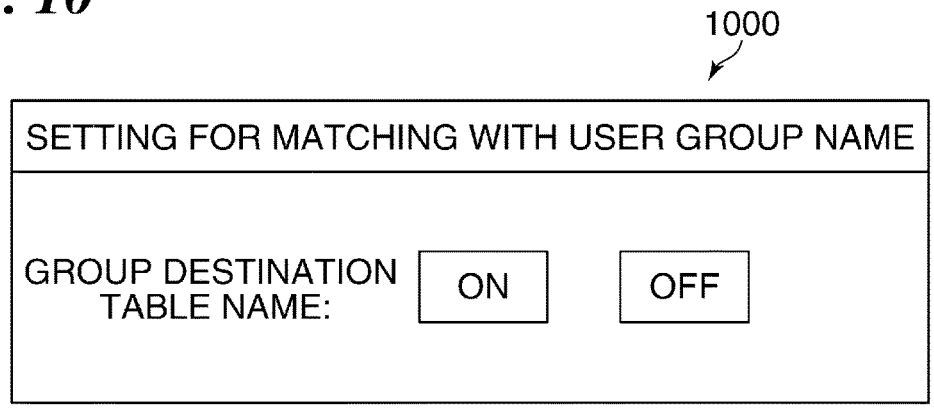
FIG. 10 is a diagram showing a screen for setting whether or not to match a name of a group destination table and a name of a user group with each other.

Next, the CPU 201 obtains a value of a setting switch for selecting whether or not to match the name of the user group and the name of a group destination table with each other (step S902). In the present embodiment, the CPU 201 displays a screen 1000 shown in FIG. 10 on the display unit of the operating unit 206, to thereby prompt the user to select "ON" or "OFF". When the user selects "ON", the CPU 201 obtains a value of the setting switch indicating that matches the name of the user group and the name of the group destination table with each other. On the other hand, when the user selects "OFF", the CPU 201 obtains a value of the setting switch indicating that does not match the name of the user group and the name of the group destination table with each other.

Then, the CPU 201 determines, based on the value of the setting switch obtained in the step S902, whether or not the setting to match the name of the user group and the name of the group destination table with each other has been made (step S903).

Upon determining in the step S903 that the setting to match the name of the user group and the name of the group destination table with each other has been made, the CPU 201 obtains the name of the group destination table linked to the user group of which the name was changed in the step S901. Specifically, the CPU 201 searches the column 605 of the data management table 600b shown in FIG. 6B to obtain the name of the group destination table to which the user group ID input in the step S901 is linked (step S904).

The CPU 201 changes the name of the group destination table obtained in the step S904 to the same one as the name of the user group set in the step S901, updates the column 605 of the data management table 600b shown in FIG. 6B with the change of the name of the group destination table (step S905), and ends the present process.

Next, referring to FIG. 6B, a process which is carried out when a name of a user group with a user group ID "GROUP A" has been changed from "DESIGN ROOM 11" to "DESIGN ROOM 112" in the step S901, will be exemplified.

The CPU 201 retrieves the user group with the user group ID "GROUP A" from the column 606 of the data management table 600b, which is shown in FIG. 6B and managed in the group destination table DB 407, and obtains a group destination table ID "1" for the user group retrieved from the column 604.

Then, the CPU 201 obtains a name "DESIGN ROOM 11" of a group destination table linked to the obtained group destination table ID "1" from the column 605.

Here, the CPU 201 changes the name of the group destination table from the obtained name "DESIGN ROOM 11" to "DESIGN ROOM 112", the user group name changed in the step S901.

It should be noted that a fixed character string (for example, "address book for") may be added when the name of the group destination table is changed so as to be the same as the name of the user group in the step S905.

Specifically, when the name of the group destination table is changed by using the name "DESIGN ROOM 112" of the user group, the name of the group destination table is changed, while a fixed character string ("address book for") is added to the name "DESIGN ROOM 112", from "DESIGN ROOM 112" to "address book for DESIGN ROOM 112".

It should be noted when it is determined in the step S903 that the setting to match the name of the user group and the name of the group destination table with each other has not been made, the present process is ended.

As described above, according to the present embodiment, when the setting to match the name of the user group and the name of the group destination table with each other has been made, the user only has to change the name of the user group so as to match the name of the group destination table with the name of the user group. This increases convenience for the user.

Embodiment 2

A description of an embodiment 2 of the present invention will be given while referring to FIGS. 11 and 12. Only points different from the embodiment 1 described above, will be described.

Figure 11:
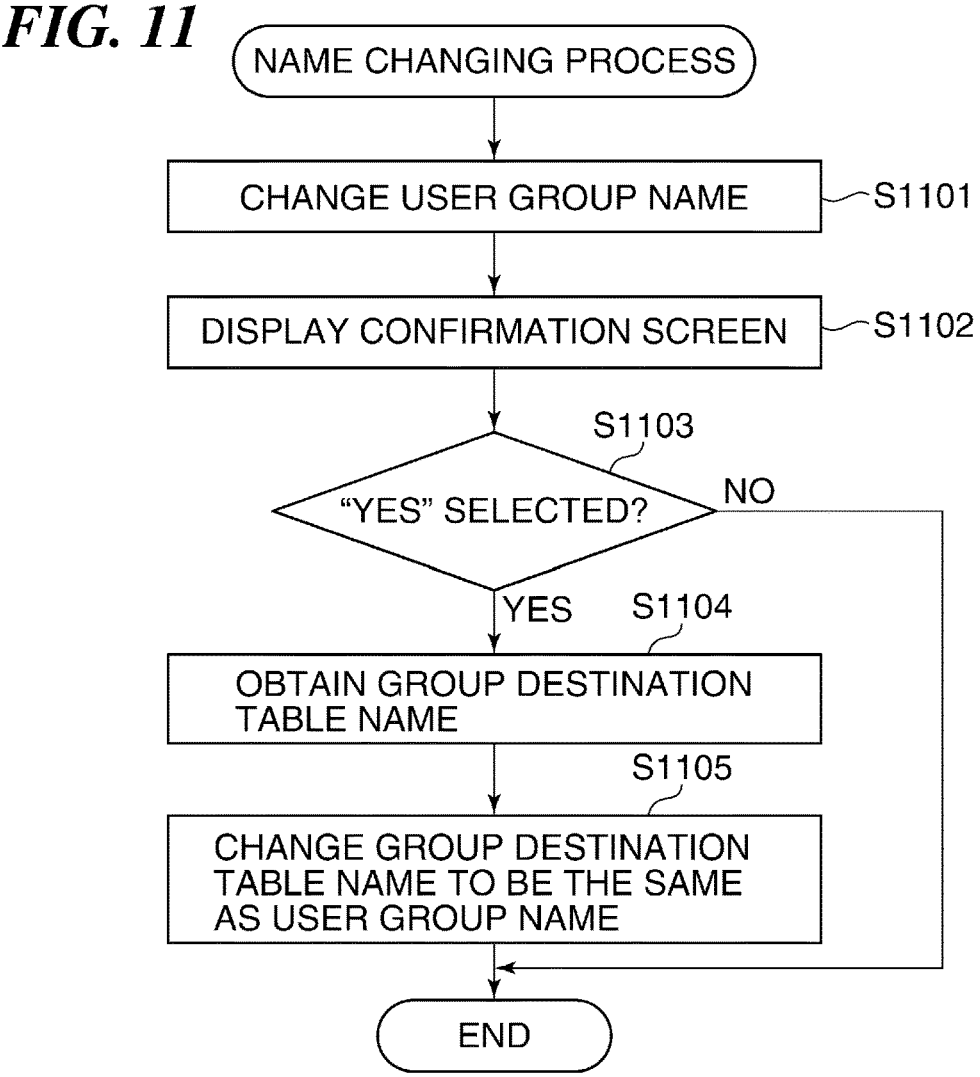
FIG. 11 is a flowchart showing a procedure of a change process of names of a user group and a group destination table in an embodiment 2.

FIG. 11 is a flowchart showing a procedure of a change process of names of a user group and a group destination table according to the present embodiment.

Referring to FIG. 11, first, the CPU 201 carries out the same process as in the step S901 to change a name of a user group (step S1101).

When the name of the user group has been changed in the step S1101, the CPU 201 displays, on the display unit of the operating unit 206, a confirmation screen 1200 (shown in FIG. 12), which prompts the user to confirm whether or not to match the name of the user group and the name of the group destination table with each other (step S1102).

Figure 12:
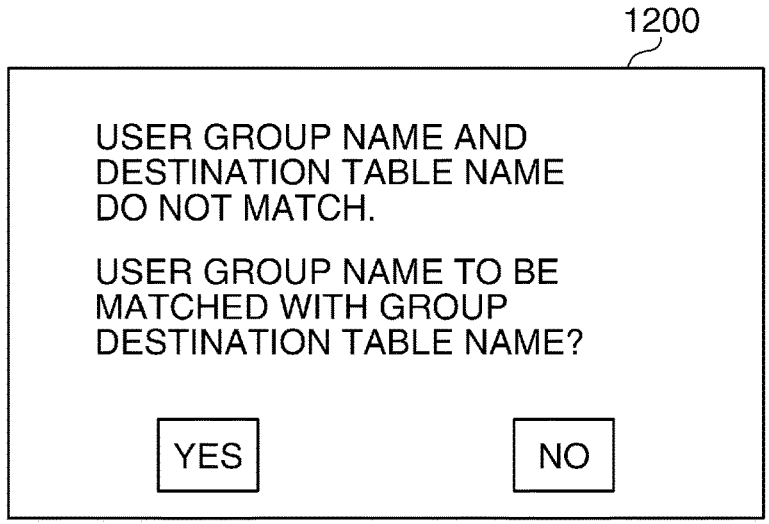
FIG. 12 is a diagram showing a confirmation screen displayed in step S1102 in FIG. 11.

When "YES" is selected on the confirmation screen 1200 shown in FIG. 12 (YES in the step S1103), the CPU 201 determines that the process in the step S905 is valid, and the process proceeds to step 1104.

In the step S1104, the CPU 201 carries out the same process as in the step S904 to obtain a name of a group destination table linked to the user group of which the name has been changed.

Next, the CPU 201 carries out the same process as in the step S905 to match the name of the user group and the name of the group destination table with each other (step S1105).

When "NO" is selected on the confirmation screen 1200 shown in FIG. 12 (NO in the step S1103), the CPU 201 determines that the process in the step S905 is invalid and ends the present process.

As described above, according to the present embodiment, the name of the user group and the name of a group destination table are matched with each other at the time when the name of the user group is changed only in a case where a user desires, and therefore, convenience for the user is improved.

It should be noted that although in the present embodiment, the confirmation screen shown in FIG. 12 is displayed on the display unit of the operating unit 206 so as to prompt the user to confirm whether or not to match the name of the user group and the name of the group destination table with each other, the notification can be provided to the user by using another method such as sound.

Embodiment 3

A description of an embodiment 3 of the present invention will be given while referring to FIG. 13. Only points different from the embodiment 1 described above, will be described.

Figure 13:
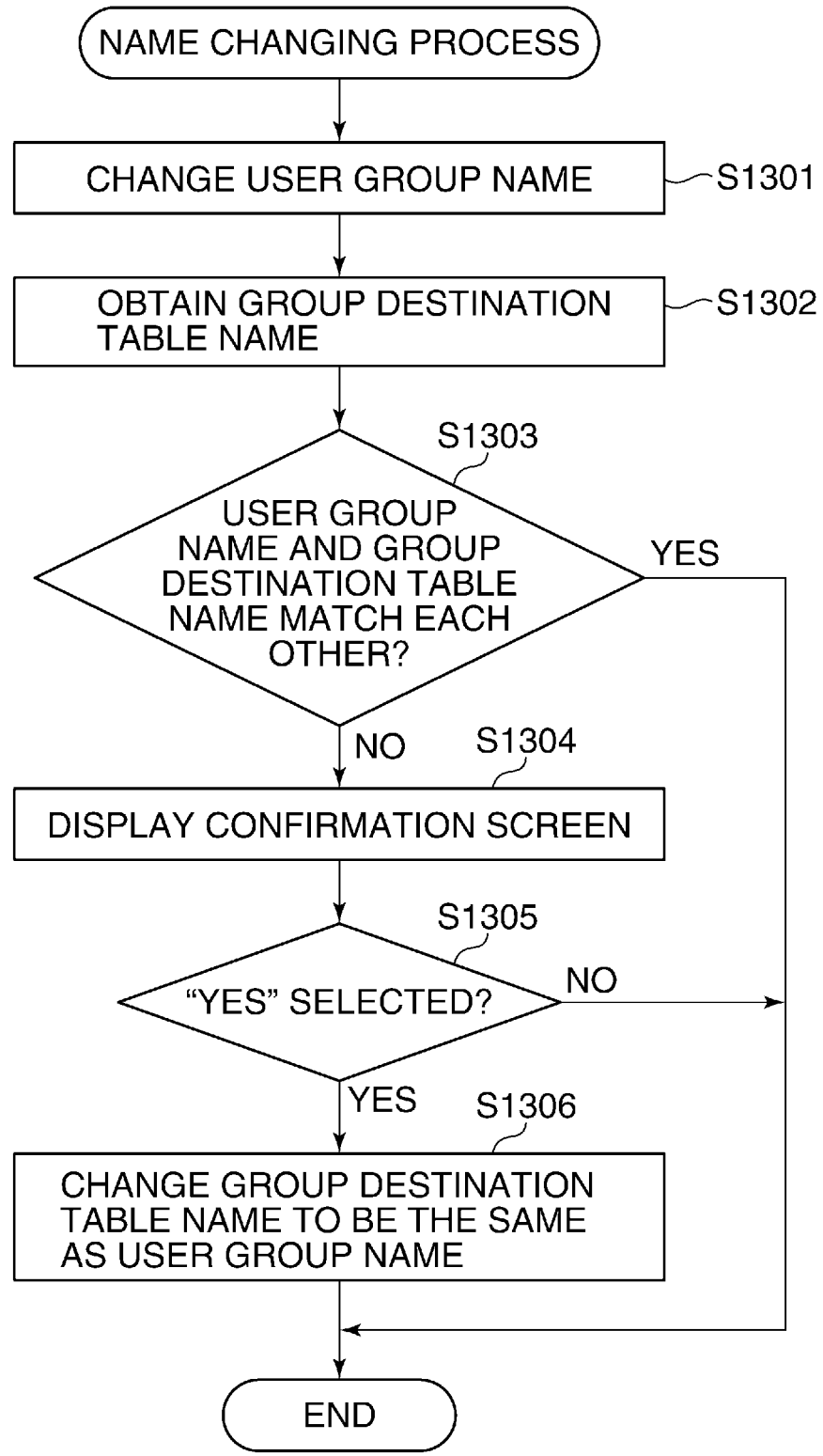
FIG. 13 is a flowchart showing a procedure of a change process of names of a user group and a group destination table in an embodiment 3.

FIG. 13 is a flowchart showing a procedure of a change process of names of a user group and a group destination table according to the present embodiment.

Referring to FIG. 13, first, the CPU 201 carries out the same process as in the step S901 to change a name of a user group (step S1301).

Next, the CPU 201 carries out the same process as in the step S904 to obtain a name of a group destination table linked to the user group of which the name has been changed (step S1302).

Then, the CPU 201 determines whether or not the name of the user group changed in the step S1301 and the name of the group destination table obtained in the step S1302 match with each other (step S1303).

Upon determining in the step S1303 that they do not match with each other, the CPU 201 carries out the same process as in the step S1102 to display the confirmation screen 1200 (shown in FIG. 12) on the display unit of the operating unit 206 (step S1304).

When "YES" is selected on the confirmation screen 1200 shown in FIG. 12 (YES in the step S1305), the CPU 201 changes the name of the group destination table obtained in the step S1302 to the name of the user group set in the step S1301 (step S1306). Specifically, the CPU 201 registers the name of the user group set in the step S1301 into the column 605 shown in FIG. 6B in which names of group destination tables are managed.

When "NO" is selected on the confirmation screen shown in FIG. 12 (NO in the step S1305), the present process is ended.

When it is determined in the step S1303 that the changed name of the user group destination table and the obtained name of the group destination table match with each other, the present process is ended as well.

As described above, according to the present embodiment, the confirmation screen for confirming whether or not to match a name of a user group and a name of a group destination table with each other is displayed only when the names do not match. When it is unnecessary to display the confirmation screen, that is, when the names match with each other, the confirmation screen is not displayed, which improves convenience for users.

It should be noted that although in the embodiments 1 to 3 described above, the information processing apparatuses according to the present invention are the MFPs 103 and 105, the present invention is not limited to this, the information processing apparatuses according to the present invention can be PCs or smart phones as long as they are information processing apparatuses that hold user groups and group destination tables.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-048420, filed Mar. 14, 2017, which is hereby incorporated by reference herein in its entirety.

What is claimed is:

1. An information processing apparatus comprising,
a storage device;
at least one memory storing instructions, and
at least one processor executing the instructions causing the information processing apparatus to:
manage, using the storage device, a user group including at least one user ID;
store, in the storage device, a group destination table associated with the user group and including at least one address;
receive, according to a user's instruction, a setting indicating whether or not execution of a change of a name of the group destination table based on a change of a name of the user group is valid;
prompt a user to select the user group;
receive a new name for the selected user group; and
set the new name as a name of the group destination table associated with the selected user group, only in a case where the received setting indicates that the execution of the change of the name of the group destination table based on the change of the name of the user group is valid.

2. The information processing apparatus according to claim 1, wherein when the new name for the user group is received, the setting is received according to the user's instruction.

3. The information processing apparatus according to claim 1, wherein the at least one processor executes further instructions causing the information processing apparatus to, when the new name for the user group is received, obtain the name of the group destination table,
wherein only in a case where the obtained name of the group destination table does not match with the new name for the user group, the setting is received according to the user's instruction.

4. The information processing apparatus according to claim 1, wherein the storage device stores a first data management table that has a plurality of user groups each of which includes at least one user ID, while user group names are associated with respective the plurality of user groups.

5. The information processing apparatus according to claim 4, wherein the storage device stores a second data management table that has a plurality of group destination tables each of which includes at least one address, while group destination table names are associated with respective the plurality of group destination tables and a predetermined user group of the plurality of user groups is associated with respective the plurality of group destination tables.

6. The information processing apparatus according to claim 1, wherein when the new name for the selected user group is received, the received new name is set as a name of the group destination table.

7. The information processing apparatus according to claim 1, wherein one user group is associated with one group destination table stored in the storage device.

8. The information processing apparatus according to claim 1, wherein a user with a user ID included in the user group associated with the group destination table is allowed to refer to at least one address included in the group destination table.

9. A control method for an information processing apparatus that includes a storage device, the control method comprising:

managing, using the storage device, a user group including at least one user ID;

storing, in the storage device, a group destination table associated with the user group and including at least one address;

receiving, according to a user's instruction, a setting indicating whether or not execution of a change of a name of the group destination table based on a change of a name of the user group is valid;

prompting a user to select the user group;

receiving a new name for the selected user group; and setting the new name as a name of the group destination table associated with the selected user group, only in a case where the received setting indicates that the execution of the change of the name of the group destination table based on the change of the name of the user group is valid.

10. A non-transitory computer-readable storage medium storing a program for causing a computer to execute a control method for an information processing apparatus that includes a storage device, the control method comprising:

managing, using the storage device, a user group including at least one user ID;

storing, in the storage device, a group destination table associated with the user group and including at least one address;

receiving, according to a user's instruction, a setting indicating whether or not execution of a change of a name of the group destination table based on a change of a name of the user group is valid;

prompting a user to select the user group;

receiving a new name for the selected user group; and setting the new name as a name of the group destination table associated with the selected user group, only in a case where the received setting indicates that the execution of the change of the name of the group destination table based on the change of the name of the user group is valid.

* * * * *